United States Patent [19]

Ichioka et al.

[11] 3,787,879

[45] Jan. 22, 1974

[54] MAGNETIC INK RECORDING SYSTEM

[75] Inventors: Satoshi Ichioka; Shinjiro Takeuchi, both of Toda, Japan

[73] Assignee: Mishima Kosan Co., Ltd., Kitakyushu-City, Fukuoka Prefecture

[22] Filed: May 28, 1971

[21] Appl. No.: 148,014

[30] Foreign Application Priority Data

Dec. 3, 1970 Japan .............................. 45-107017
Dec. 31, 1970 Japan .............................. 45-123586

[52] U.S. Cl. .................. 346/140, 101/1, 346/74 MP

[51] Int. Cl. ........................................... G01d 15/16

[58] Field of Search..346/140, 74 MP; 101/DIG. 13, 101/1; 197/1

[56] References Cited

UNITED STATES PATENTS 3,279,367 10/1966 Brown ...................... 101/DIG. 13 X
3,450,043 6/1969 Flax .......................... 101/DIG. 13 X
3,509,816 5/1970 Spaulding .............................. 101/1
3,526,708 9/1970 Leatherman ......................... 178/6.6

*Primary Examiner*—Joseph W. Hartary
*Attorney, Agent, or Firm*—Wenderoth, Lind & Ponack

[57] ABSTRACT

Recording of magnetic ink on a continuous moving recording paper inserted between magnetic ink supply nozzles and opposed magnetic heads is performed by producing a magnetic field sufficient to attract magnetic ink. Magnetic ink supply nozzles each contain magnetic ink and have a first coil wound thereon to assist the magnetic field and a second coil thereon to oscillate the magnetic ink in the nozzles. Magnetic ink supply means can be a honeycomb mesh and magnetic heads are integrated to produce a dense recording.

2 Claims, 7 Drawing Figures

SATOSHI ICHIOKA and
SHINJIRO TAKEUCHI,

INVENTORS

BY Wenderoth, Lind & Ponack

ATTORNEYS

SATOSHI ICHIOKA and
SHINJIRO TAKEUCHI,

INVENTORS

BY Wenderoth, Lind & Ponack

ATTORNEYS

MAGNETIC INK RECORDING SYSTEM

BACKGROUND OF THE INVENTION

The present invention relates to magnetic recording system to record magnetic images such as letters, signs or figures on a recording paper.

It is known to apply magnetic ink to the surface of type and print optically readable or unreadable magnetic letters or signs by pressing the type on a recording paper.

Further, to print desired letters, signs or figures, it is necessary to provide some moving parts such as type or lithographs to be pressed on a recording paper. However, in some cases, especially to produce special signs or figures which are not found on the type of an ordinary typewriter, it is not easy to print such images. Also, to utilize moving parts to press on a paper is also disadvantageous with respect to noise, speed, inertia force, etc.

SUMMARY OF THE INVENTION

A primary object of the present invention is to provide a magnetic recording device to record data forming desired images such as letters, signs or figures of magnetic ink on a continous moving recording paper without utilizing reciprocating moving parts.

To attain the abovementioned object, there is provided a magnetic recording device which has a plurality of magnetic heads disposed in at least one row and each head having a core. A first coil is wound about said core, and a plurality of independent nozzles are provided, one opposed to each of the magnetic heads and each containing liquid magnetic ink which will flow out of the nozzles only under the effect of a magnetic force. A second coil is wound on each nozzle for increasing the magnetic force acting on the ink. Control means is connected to the first and second coils for selectively supplying pulse signals to the coils to form a magnetic field for each head and nozzle sufficient to eject sufficient ink from the nozzle to form a dot. A third coil is wound around each nozzle, and an alternating current supply source is connected with the third coils for supplying an alternating force sufficient only to oscillate the magnetic ink contained in the nozzles. A recording paper is positioned between the nozzles and magnetic heads, and drive means drives the paper at a constant speed. By this means, images formed by dots are recorded on the recording paper.

The magnetic heads can be formed as slender bar-like electromagnets, so that rows of nozzles or a matrix of nozzles each of which are aligned with a magnetic head, can be selectively energized to form dots on the continuously moving recording paper.

By winding the second and third coils around the nozzles, positive acceleration of the liquid magnetic ink in the nozzles can be achieved. Moreover, oscillation of the magnetic ink by the alternating force maintains the liquid condition of the ink and assures instantaneous ejection of the ink even after a long interval since the last ejection.

According to another feature of the invention, the nozzles and magnetic heads can be mounted on a means which will move the nozzles and magnetic heads simultaneously in a direction transverse of the recording paper.

BRIEF DESCRIPTION OF THE DRAWING

Embodiments of the invention will now be described, by way of example, with reference to the accompanying diagrammatic drawings, in which.

DESCRIPTION OF PREFERRED EMBODIMENT

Figures 1, 2, 3, 4, 5:
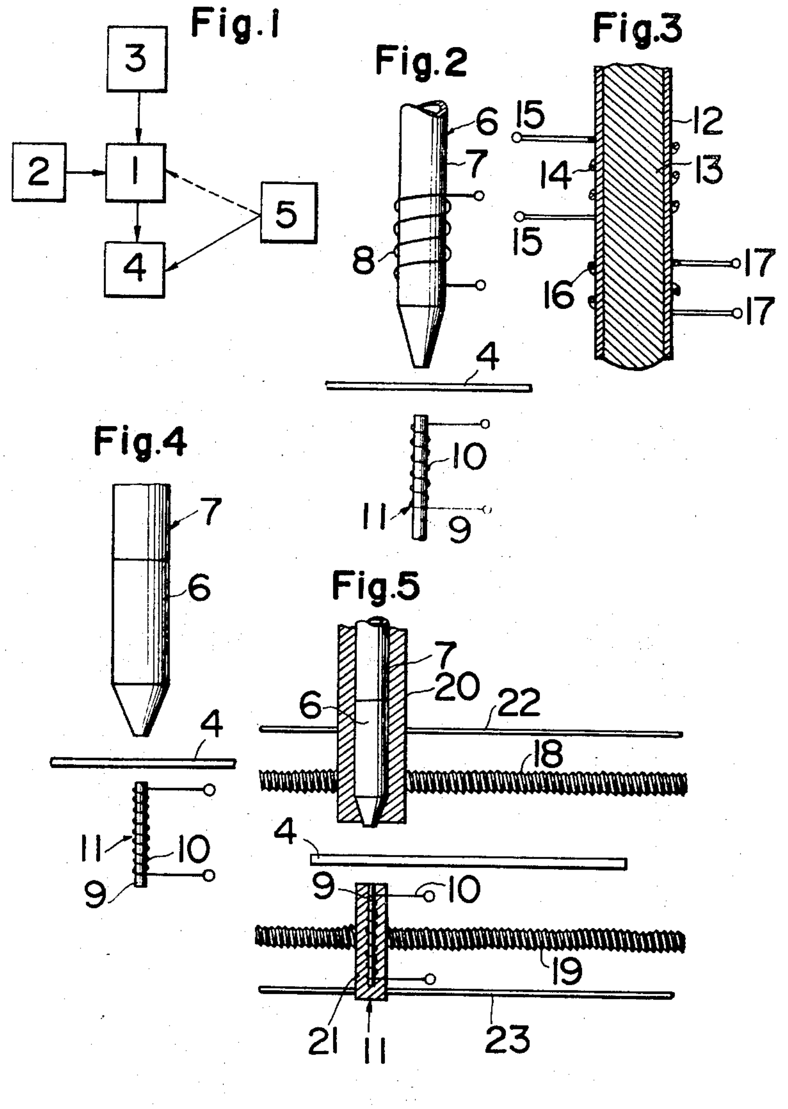
FIG. 1 is a block diagram of magnetic recording system according to the invention.
FIG. 2 is a diagrammatic elevation of the recorder section of the magnetic recording system shown in FIG. 1.
FIG. 3 is a fragmental longitudinal sectional view of the nozzle shown in FIG. 2 having vibrating means for the magnetic ink.
FIG. 4 is a diagrammatic elevation of a further feature of the magnetic recording system according to the invention.
FIG. 5 is a diagrammatic elevation of a third embodiment of the magnetic recording system.

Referring to FIG. 1, magnetic ink is supplied to recorder section 1 from magnetic ink supply section 2. Control section 3 selectively controls magnetic ink nozzle means or magnetic head means of the recorder section 1 to print an image such as a magnetic letter, figure or sign on recording paper 4 by the recorder section. Driving section 5 drives the recording paper in one direction and also drives the recorder section 1 as necessary.

One embodiment of the recorder section 1 is shown in FIG. 2. Magnetic ink 6 is placed in a nozzle 7 around which is wound a coil means 8. The ink has a consistency such that it will flow out of the nozzle only under the effect of a magnetic force. A core 9 is axially aligned with the nozzle 7 and has a coil 10 therearound to form a magnet means 11.

When direct current is applied across the coil 8 of the nozzle 7 to magnetize the magnetic ink 6 as a single magnet, and pulse current is applied across the coil 10 of the magnet 11 to exert a pull on the magnetized only the magnetic ink 6, magnetic ink in the nozzle tip portion is pulled out of the nozzle by the magnet 11. By inserting a recording paper 4 between the nozzle 7 and the magnet 11, magnetic ink 6 pulled by the magnet 11 is applied as a spot on the paper. Thus, by driving the nozzle 7 and the magnet 11 by the driving section 5 shown in FIG. 1, and also by displacing the recording paper 4 by the driving section 5, magnetic images such as letters, figures or signs can be recorded under control of the control section 3.

The magnet 11 and nozzle 7 of the recorder section 1 can be arranged in pairs transverse to the direction of feeding of the paper 4, or the nozzles and magnets each can be integrated in one unit. In both cases, by driving only the paper 4, and by controlling proper actuation of the nozzles, necessary recording can be performed. The embodiments will be described hereinafter referring to FIGS. 4 and 5.

The above embodiment is one in which the coil 8 has direct current applied thereto. However, an alternating current bias can be applied across the coil 8 just sufficient to oscillate the magnetic ink 6 in the nozzle 7 without itself being sufficient to cause discharge of ink to facilitate discharge of the magnetic ink from the nozzle toward the magnet 11. In this case, recording can be efficiently performed by applying pulsed current to the magnet 11. Also, an alternating current bias can be superimposed on direct current across the coil 8. By properly controlling the alternating current and direct current applied to the coil 8 and pulsed current applied to the magnet 11 by the control section 3, positive and efficient recording can be performed.

FIG. 3 shows another embodiment of the present invention. A nozzle 12 is filled with magnetic ink 13 which can be moved in the nozzle. Coil means 14 wound around the nozzle 12 have terminals 15 and 15' across which direct current and alternating bias current are applied. Another coil means 16 is wound around the tip portion of the nozzle 12 and has terminals 17 and 17' to apply a magnetic field to the magnetic ink 13 corresponding to an input signal across the terminals 17 and 17'. When direct current having alternating current superimposed thereon is applied across the terminals 15 and 15', static and alternating magnetic fields are induced by the coil 14 to oscillate the magnetic ink 13 in axially magnetized condition by properly selecting the intensity and frequency of the alternating magnetic field.

As dynamic friction between the magnetic ink 13 and the internal wall of the nozzle 12 and between the grains of the magnetic ink 13 is smaller than static friction caused without an alternating magnetic field, magnetic ink 13 can be displaced easier when applying alternating current to the coil 14. In this oscillating condition, when an input signal is applied across terminals 17 and 17' of this coil 16 to produce a magnetic field having an opposite polarity to the magnetic field produced by the coil 14, a separating force is produced in the magnetic ink 13 at the tip portion of the nozzle 12 to effect ejection of the magnetic ink 13 from the nozzle tip. Thus, magnetic ink is deposited on recording paper (not shown) opposed to the nozzle tip.

In the above described embodiment, means are provided on the nozzle 7 or 12 to facilitate discharge of the magnetic ink. However, in some cases, magnetic ink can be drawn from the nozzle without any means to magnetize or oscillate it, when sufficiently strong magnetic field is applied to the magnetic ink supply means to facilitate attraction. Such an embodiment is shown diagrammatically in FIG. 4. The core or wire 9 of the magnet 11 is magnetized by pulsed current applied across the coil 10. Magnetic ink 6 is drawn or ejected from nozzle 7 without any coil means such as is shown in FIG. 2, and the ejected magnetic ink 6 is deposited on the recording paper 4 to make the desired record.

The nozzle shown in FIGS. 2–4 can be formed from needle like non magnetic material, and also the opposed magnet 11 can be formed as a very slender wire so that the dimension of the nozzle and magnet or dimension of the recording section 1 can be kept small.

The nozzle and magnet shown in FIGS. 2–4 can be driven in pairs laterally of the displacement of the recorder paper 4 by driving section 5, to effect desired recording. Such an embodiment is shown in FIG. 5. Lead screws 18 and 19 are arranged transverse to the direction of displacement of the recording paper 4 and are rotated at the same speed. Mountings 20 and 21 each having a female thread are engaged with the lead screw 18 and 19 and have nozzle 7 and magnet 11 mounted thereon respectively. Guide means 22 and 23 are disposed parallel to the lead screws 18 and 19 and are slidably engaged by the mountings 20 and 21 to ensure alignment; of the nozzle and the magnet. Thus, the nozzle 7 and the magnet 11 are simultaneously displaced laterally of the displacement of the recording paper 4 by driving means 5 under control of the control section 3 to effect desired recording on the paper 4.

Figure 6:
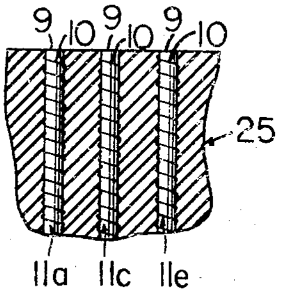
FIG. 6 is a partial sectional view of an integrated magnetic head.
Figure 7:
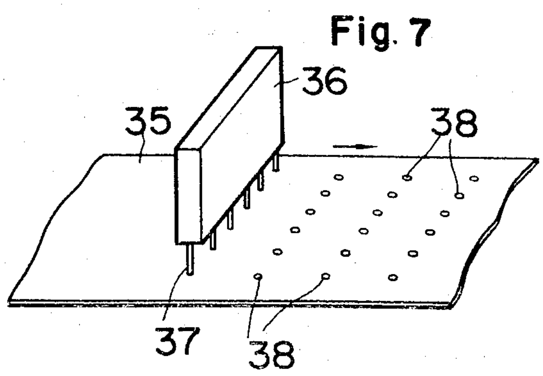
FIG. 7 is a perspective view of integrated nozzles.

The nozzles 7 to supply magnetic ink 6 and the magnets 11 shown can be integrated in one unit as shown in FIGS. 6–8.

An integrated magnetic head 25 is shown in FIG. 6 and comprises a number of magnets 11*a*, 11*b*, 11*c* which are constructed as shown in FIGS. 2–4 and are suitably arranged in a pattern so as to be aligned with the nozzles. The magnets 11*a*, 11*c* and 11*e* are enclosed in shield material such as heat resistant plastic and the head of the core is substantially in plane of the surface of shield material. The diameter of the magnet can be made as small as 0.1 mm for facsimile equipment, so that by scanning the magnets with a control section and by selectively energizing selected magnets while rotating the drum at the speed of displacement of the recording paper 4, clear markings can be made.

An embodiment to record codes or letters on paper tape is shown in FIG. 7. Tape means 35, such as paper or the like is driven by driving means (not shown) past a recorder section 36. The recorder section 36 shown comprises a plurality of nozzles 37 and a magnetic head, not visible beneath the tape means 35, having a plurality of magnets each aligned with a corresponding nozzle 37. In operation, an input signal is applied to the magnets of the magnetic head under control of a control section not shown, so that magnetic ink is discharged from the aligned nozzle 37 to record the desired letter or code 38 on the paper tape 35.

What is claimed is:

1. A magnetic recording device comprising a plurality of magnetic heads disposed in at least one row and each head having a core and a first coil wound about said core, a plurality of independent nozzles one opposed to each of said magnetic heads and each containing liquid magnetic ink which will flow out of the nozzles only under the effect of a magnetic force, a second coil wound around each nozzle for increasing the magnetic force acting on the ink, control means connected with said first and second coils for selectively supplying pulse signals to said coils to form a magnetic field for each head and nozzle sufficient to eject sufficient ink from the nozzle to form a dot, a third coil wound around each nozzle, an alternating current supply source connected with the third coils for supplying an alternating force sufficient only to oscillate the magnetic ink contained in the nozzles, a recording paper positioned between said nozzles and magnetic heads, and drive means driving the paper at a constant speed, whereby images formed by dots are recorded on the recording paper.

2. A magnetic recording device comprising a plurality of magnetic heads disposed in at least one row and each head having a core and a coil wound about said core, a plurality of independent nozzles one opposed to each of said magnetic heads and each containing liquid magnetic ink which will flow out of the nozzles only under the effect of a magnetic force, control means connected with said coils for selectively supplying pulse signals to said coils to form a magnetic field for each head sufficient to eject sufficient ink from the nozzle to form a dot, a recording paper positioned between said nozzles and magnetic heads, a first drive means driving the paper at a constant speed, and a further drive means on which said nozzles and magnetic coils are mounted to move said nozzles and magnetic coils simultaneously in a direction transverse of said recording paper, whereby images formed by dots are recorded on the recording paper.

* * * * *